Nov. 17, 1936.  W. M. THOMPSON  2,061,491
CUTTING TOOL
Filed July 19, 1935
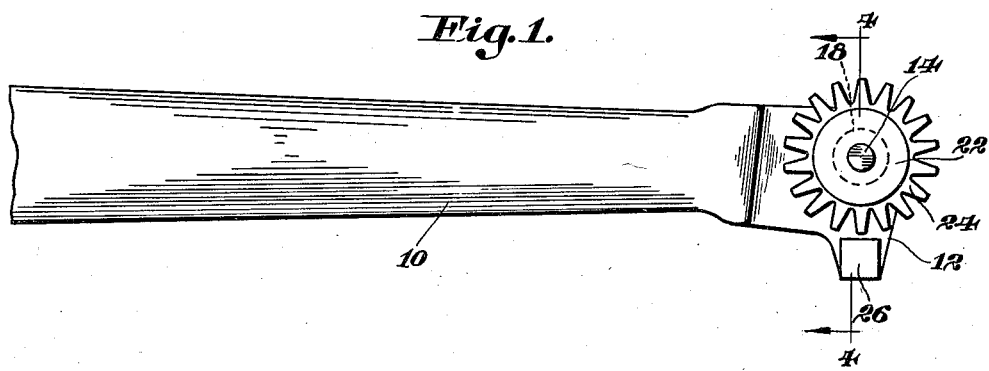
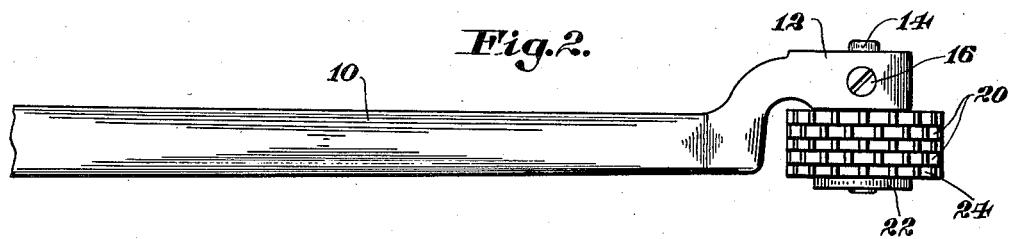
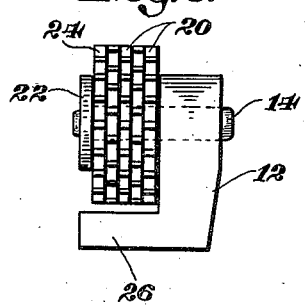
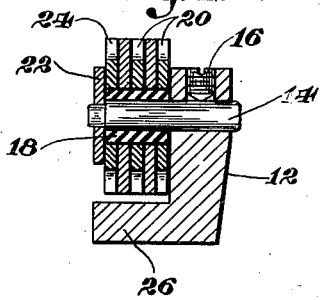
INVENTOR.
William M. Thompson
BY
J. L. Chisholm
ATTORNEY.

Patented Nov. 17, 1936

2,061,491

UNITED STATES PATENT OFFICE 2,061,491

CUTTING TOOL

William M. Thompson, Meadville, Pa.

Application July 19, 1935, Serial No. 32,177

8 Claims. (Cl. 125—37)

This invention relates to tools for cutting or dressing stone and the like and is especially adapted, though not limited, to tools for dressing or truing abrasive or grinding wheels.

It is among the objects of the invention to provide an improved stone cutting tool which will remain true for a long period of time and which will cut a more accurate surface on grinding wheels than the tools heretofore known and which will minimize the danger of gouging the surface of the stone being dressed. Another object of the invention is to provide an improved construction of dressing tools which will facilitate the dressing of sides of grinding wheels by permitting the tool to be operated close to the center of the wheel.

Other objects of the invention will be evident from the accompanying description and annexed drawing in which Fig. 1 is a side elevation of one form of dressing tool embodying my invention;

Fig. 2 is a plan;

Fig. 3 is an end elevation; and

Fig. 4 is a section on the line 4—4 of Fig. 1.

Referring to the drawing, a hand tool 10 is provided with a spindle 14 which is supported in any suitable manner, and held in place by any suitable securing means such as a set screw 16. A bushing 18 surrounds the spindle and any suitable number of hardened steel cutting wheels or spurs 20 are rotatably mounted on the bushing.

As so far described the dressing tool is well known and the particular form of the elements is immaterial to the invention. Dressing tools of this character are either used as hand tools for dressing grinding wheels or the spindle with the dressing or cutting wheels may be mounted as cutting units in dressing heads which are rotated over large surfaces of stationary stones to cut or dress the latter. In previously known tools of this character the bushings have been of metal such as hard steel, bronze bearing metal, or the like, and in some instances, the spur wheels have been mounted directly on the spindle which is frequently hardened. The cutting wheels in this type of tool wear very rapidly and frequently wear unevenly at their points so that after a relatively short period of use the points do not describe or generate a true cylindrical surface and it becomes difficult, if not impossible, to produce an accurate surface on the grinding wheel. Likewise, the wear between the dressing wheels and the spindle or bushing is very rapid with the result that wheels soon become loose on the shaft or bushing, and chatter. The hole through the wheel becomes much larger than the spindle or bushing, and the chattering frequently becomes so violent as to make the tool useless because it either becomes impossible to dress grinding wheel to an accurate surface or because the chattering will start suddenly during a dressing operation and gouge the wheel.

Attempts to lubricate dressing wheels of this character have made matters worse because the abrasive paste formed by the mixture of lubricant and abrasive dust from the stone causes more rapid wear than when the tool is not lubricated.

I have discovered that all of the above mentioned disadvantages are largely or completely eliminated and an extremely accurate dressing wheel of long life is provided by resiliently supporting the cutting wheels, preferably by forming the bushing of resilient material such as soft rubber. I prefer to use a firm but resilient rubber composition impregnated with graphite. The graphite serves as a dry lubricant which does not collect abrasive dust and which reduces the wear and lengthens the useful life of the tool. The spur wheel does not wear as rapidly as when mounted on a metal bushing or directly on the spindle, and whatever wear occurs is more nearly uniform, so that the ends of the spur wheels continue to lie in a true cylindrical surface and effect an accurate surface on the stone to be dressed. Preferably the bushing fits the spindle with the least possible friction without having radial play between bushing and spindle, while the cutting wheels fit snugly but rotatably on the bushing. Thus the bushing permits rotation of the wheels on the bushing, but friction offers a definite small resistance to this rotation. This allows the dressing wheels to rotate and adjust themselves with respect to each other, and prevents looseness and chattering.

Another feature of my invention is the provision of a single cheek or support 12 for the spindle and the provision of a thin head 22 on the free end of the spindle for holding the bushing and spur wheels in place. This provides an over-hung or cantilever support which permits the end-most spur wheels 24 to be operated on the side of the customary power-driven abrasive wheel close to the center or drive shaft, without interference by a support of any character. This allows the dressing tool to be operated clear up to the supporting collar on the shaft of the grinding wheel to effect an accurate dressing of the entire exposed side surface of the dressing wheel, an operation that cannot be performed with existing types of dressing tools.

A support 26 extends the full axial width of the group of cutting wheels, facilitating sliding of the dressing tool on a tool rest and holding the dressing wheels in a plane parallel to the plane of the abrasive wheel being dressed.

What I claim as my invention is:

1. A stone dressing tool comprising in combination a support, a spindle mounted at one end in said support, the other end of spindle being entirely unsupported, a resilient bushing freely rotatable on said spindle and a plurality of independently rotatable cutting wheels mounted on said bushing.

2. In a stone dressing tool the combination of a plurality of independently rotatable cutting means and a resilient bearing for the cutting means.

3. In a stone dressing tool the combination of rotatable cutting means, a spindle for rotatably supporting the cutting means and a resilient bushing between the cutting means and the spindle, the bushing being freely rotatable on the spindle and having a frictional engagement with the cutting means which permits but resists rotation of the cutting means on the bushing.

4. In a stone dressing tool the combination of a plurality of independently rotatable cutting means, a spindle for rotatably supporting the cutting means and a rubber bushing between the spindle and cutting means.

5. In a stone dressing tool the combination of a plurality of independently rotatable cutting means, a spindle for rotatably supporting the cutting means and a bushing between the cutting means and spindle, the bushing being formed of rubber impregnated with a lubricant.

6. In a stone dressing tool the combination of a plurality of independently rotatable cutting means, a spindle for rotatably supporting the cutting means and a bushing between the cutting means and spindle, the bushing being formed of rubber impregnated with graphite.

7. In a stone dressing tool the combination of a spindle, a resilient bushing mounted on the spindle and a plurality of independently rotatable cutting means mounted on the resilient bushing.

8. In a stone dressing tool the combination of a spindle, a plurality of cutting means supported by the spindle and freely rotatable with respect to the spindle, said cutting means being independently rotatable with respect to one another and means comprising a rubber bushing between the spindle and the cutting means for resisting relative rotation of the cutting means with respect to one another.

WILLIAM M. THOMPSON.